Nov. 5, 1940.  C. A. SPOTZ  2,220,465
RETAINING MEANS FOR AN AUTOMOTIVE VEHICLE BRAKE SYSTEM
Filed Jan. 19, 1937
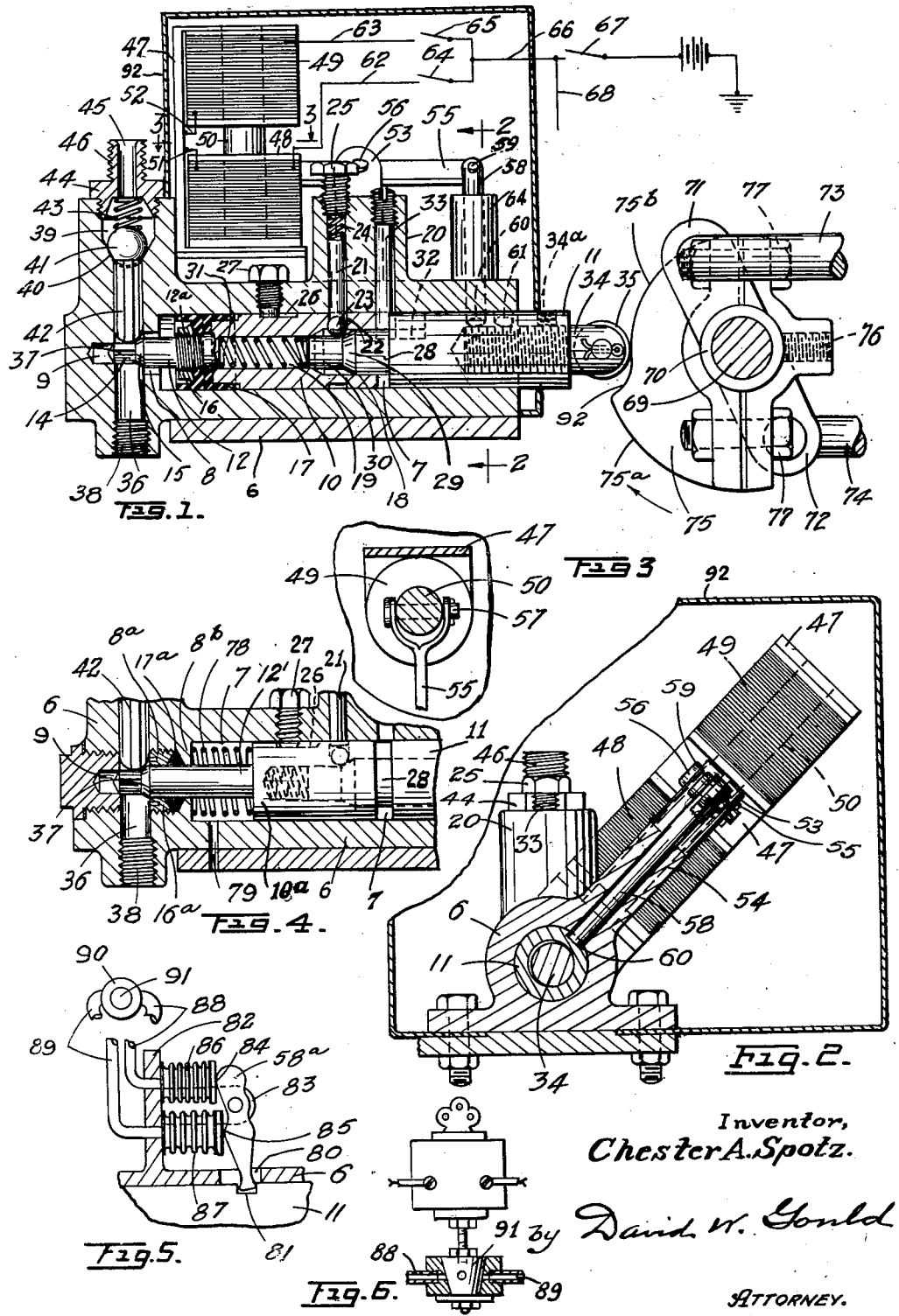
Inventor,
Chester A. Spotz.
by David W. Gould
ATTORNEY.

Patented Nov. 5, 1940

2,220,465

UNITED STATES PATENT OFFICE 2,220,465

RETAINING MEANS FOR AN AUTOMOTIVE VEHICLE BRAKE SYSTEM

Chester A. Spotz, Greenwich, Conn.

Application January 19, 1937, Serial No. 121,362

12 Claims. (Cl. 192—13)

This invention relates to retaining means for an automotive vehicle brake system.

In the operating of an automobile there are many occasions when it would be desirous and advantageous to have a means for retaining the automobile brake system in operative position to prevent movement of the car either forwardly or rearwardly when on an incline or the possibility of movement while on level ground. This may be accomplished by use of the brake now in common use in automotive vehicles and known as the emergency brake but many operators of automobiles do not use the emergency brake when permanently stopped or find it convenient to use the same when temporarily stopped such as on an incline when stopped in traffic.

The principal object of this invention is to provide a positive means for retaining an automotive brake system in operative position when such brake system is put into operation through the medium of the brake pedal, so that the automobile will be maintained against forward or rearward movement when on an incline or as an aid or convenience to the operator when the car is stopped on an upgrade incline and it is desirous of going forward or is stopped on a downgrade incline and it is desirous of backing up.

A further object is to provide a means for retaining automotive brakes themselves in positive operation so that if any external force, such as another vehicle, moves into contact with the automobile to which my retaining means is applied, the exerted movement force is not transmitted to the means for retaining the brake system or any part of the car driving mechanism but causes the automobile as an entire unit, in brake-locked relationship to the wheels, to cause the tires to slide on the surface contact.

A further object of this invention is to provide a retaining means for automotive brakes designed and attached to work in combination with the present means now commonly in use on automobiles and without extra parts, apparatus, or fittings necessitating the operator to do other than what is commonly done at the present time when stopping or starting the automobile.

A further object of this invention is to provide a retaining means for an automotive brake system in which the basic principle of the invention therein disclosed provides for operation either hydraulically, mechanically or as a combination thereof.

A further object of this invention is to provide a retaining means for an automotive brake system in which the brake fluid is used as a power force, when operated on by the brake mechanism, to move my retaining means to operative position.

A further object of this invention is to provide retaining means for a hydraulic brake system used on automotive vehicles in which the retaining means is mechanically moved to operative position.

A further object of the invention is to provide a retaining means for a hydraulic brake system used on automotive vehicles which retaining means is provided with locking means adapted to be moved into and out of locking position when the retaining means is in operative or inoperative position.

A further object of this invention is to provide a retaining means for a hydraulic brake system used on automotive vehicles in which provision is made for overcoming lost motion or wear of those parts associated with the clutch pedal and its operation.

A further object of this invention is to provide a retaining means for a hydraulic brake system used on automotive vehicles and means for locking such retaining means in operative or inoperative position, which locking means is controlled through the medium of the ignition switch or may be controlled by direct manual operation.

With the foregoing and other objects in view, as will appear as the description proceeds, the invention consists of the novel construction, combination and arrangement of co-operating elements as hereinafter more specifically set forth, claimed and shown in the accompanying drawing forming a part of the present application, in which:

Fig. 1 is a detail view of the preferred form of my retaining means, parts being shown in section and parts in elevation.

Fig. 2 is a sectional view taken on the line 2—2 of Fig. 1.

Fig. 3 is a sectional view taken on the line 3—3 of Fig. 1.

Fig. 4 is a detail view of a modified form of my invention, parts being shown in section and parts in elevation.

Fig. 5 is a detail view of a modification of the locking means for my retaining means, parts being shown in section and parts in elevation.

Fig. 6 is a front elevation partly in section of the lock.

Like numerals of reference designate corresponding parts throughout the different views.

6 is the body portion of my retaining means, which is provided with a longitudinal bore 7, preferably annular in cross-section, extending inwardly from one end. This bore is reduced as at 8 and further reduced as at 9, the purpose of such reductions being referred to hereinafter. 10 is a piston reciprocally mounted in the bore 7 and 11 is a releasing member reciprocally mounted in the open end of the bore 7. One end of the piston 10 is provided with a reduced portion 12, which is smaller in diameter than that of the diameter of the reduced portion 8 of the bore 7, so as to leave a free passageway entirely around the reduced portion 12 where it protrudes through the reduced portion 8 of the bore 7. The protruding reduced portion 12 of the piston 10 is further reduced as at 14 to snugly fit and reciprocate in the reduced portion 9 of the bore 7. Between the reduced portion 14 and the reduced portion 12 of the piston 10, I provide a frusto-conical intermediate portion 15, the purpose of which will be referred to hereinafter. The reduced portion 12 is threaded as at 12a to receive a threaded washer 16, which retains the piston packing 17 against the shouldered end of the piston 10. This packing 17 provides a fluid tight seal at this end of the piston 10 in the bore 7. The piston 10 is provided with a bore 18 inwardly from the end, which bore is reduced as at 19. The body portion 6 is provided with a boss 20 in one side of which is provided an opening in which opening the locking pin 21 may reciprocate. The piston 10 is provided with an oppositely registering opening 22 in which is carried a ball 23 of a diameter substantially the same as the diameter of the pin 21. 24 is a tension spring, above the pin 21, retained and controlled by the tension bolt 25. The piston 10 is provided with a longitudinal slot 26 in which the inner end of the retainer bolt 27 is fitted through the body portion 6, which bolt keeps the piston 10 from any rotation in the bore 7 and acts as a positive stop to permit only longitudinal movement in either direction within a predetermined distance.

The releasing member 11 is provided with a reduced portion 28 on its inner end, which is provided with a frusto-conical portion 29 and an inner reduced portion 30, the latter being designed to reciprocate in the reduced bore 19 of the piston 10. A spring 31 is carried in the bore 19 and abuts against the inner end of the reduced portion 30 of the releasing member 11. In Fig. 1, my construction as shown, is in operative position and the ball 23 is resting on the reduced portion 30 of the releasing member 11. The releasing member 11 is provided with a longitudinal slot 32 in which the end of the stop pin 33 protrudes, which stop pin 33 is retained in and carried through the boss 20. The end of this stop pin 33 acts as a positive stop for the releasing member 11 when moved in either direction. It also acts as a stop for the end of the piston 10 when moved by fluid pressure, hereinafter referred to. 34 is a plug threadedly engaged in the outer end of the releasing member 11, which plug is provided with a cam roller 35. The plug 34 may be adjusted longitudinally in the releasing member 11 to provide proper operative relationship relative to the cam 75, hereinafter referred to. When adjusted, the plug is retained in fixed position in the releasing member by means of the set screw 34a.

The closed end of the body portion 6 is provided with a transverse opening 36 preferably at right angles to the reduced portion 8—9 of the bore 7 and in communication therewith. The reduced portion 14 of the piston is provided with a longitudinal groove 37 to eliminate pocketing of fluid in the reduced bore 9. The body portion 6 is provided with a threaded entrance 38 to the opening 36 whereby a fluid pipe line from the master cylinder of the hydraulic brake system may be connected. The opening 36 is enlarged at its upper end, as at 39, and provided with an intermediate tapered valve seat 40 for the ball 41. 42 is a valve release pin, the lower end of which is shown resting on the reduced portion 14 of the piston 10 and the upper end of which is adjacent to the ball 41. The frusto-conical portion 15 of the piston 10 is designed to raise the valve release 42, when the piston is moved to inoperative position. The ball 41 is normally retained in valve-closed position by the spring 43 when my retaining means is in operative position. The upper end of the spring 43 engages against the plug 44, which closes the upper end of the opening 36. The plug 44 is provided with a fluid opening 45 and is threaded, as at 46, to permit engagement of a fluid pipe line thereto, which fluid pipe line extends to the brake cylinder of the respective brakes of any brake system in use on automotive vehicles. The valve release pin 42 may have fluted sides to provide for the passage of a brake fluid thereby or it may be made in any other desired manner to accommodate proper releasing of the ball valve when so desired on movement of the piston 10. Furthermore I do not wish to be limited in my construction to a ball valve closure in the brake fluid line, as other valve means common to the art may be substituted for the ball valve as shown and herein described.

Supported preferably at an angle, as shown in Fig. 2, to the body member 6, I provide a support 47 in which is mounted oppositely disposed solenoids 48 and 49, with the armature 50 reciprocally mounted relative thereto. The solenoids 48 and 49 are respectively grounded to the frame of the automotive vehicle through the medium of the ground wires 51 and 52 attached or connected to the frame 47. 53 and 54 are projecting bosses, preferably integral with the body portion 6 and extending outwardly therefrom at a corresponding angle disposition to that of the support 47. The upper end of the boss 53 is slotted downwardly to allow the rocker arm 55 to be positioned therein and be rocked on the pin 56, carried transversely thereto in the boss 53. The rocker arm 55 is bifurcated at one end, providing a forked end, to be engaged on opposite sides of the armature 50 by means of the pin 57. Reciprocally mounted in the boss 54, I provide a locking pin 58, the outer end of which is slotted and connected with one end of the rocker arm 55 by the pin 59. The bore in the boss 54, for the locking pin 58 protrudes into the body portion 6 and communicates with the bore 7. The releasing member 11 is provided with two longitudinally spaced openings 60 and 61 into either of which the inner end of the locking pin 58 may engage. It may be engaged into the opening 60 when the releasing member 11 is in the operating position of my retaining means and it may be engaged into the opening 61 when the releasing member 11 is moved to inoperative position. The rocker arm 55, adapted to operate the locking pin 58 by fulcrum movement on the pin 56 caused by movement of the armature 50 is moved by energization of one or other of the solenoids 48—49 through the medium of the conductors 62 or 63 when either of the switches 64 or 65 are selectively closed and carry electrical energy from the conductor 66 connected to one side of the ignition switch 67, which side is also connected to the automotive vehicle ignition system through medium of the conductor 68.

Preferably the solenoids, the rocking arm and their associate parts as just hereinbefore described, which are the electrically operated locking means for my retaining means herein disclosed, may be provided with an enclosure container secured to the body 6 in any desired manner. I have not shown such a cover in the drawings, as I felt this could be provided in any desired shape and engaged in any desired manner as would be commonly known to the art but I specifically wish to include a cover, for this locking means, to eliminate the possibility of tampering or operation of the same by unauthorized persons, as part of my invention.

In the general construction common to automotive vehicles an auxiliary shaft, such as auxiliary shaft 69, is provided, upon which a sleeve 70 is rotatably mounted and has protruding therefrom in opposite directions spaced lugs 71 and 72. The clutch pedal rod 73 is attached at one end to the outer end of the lug 71. The clutch operation rod 74 is attached at one end to the outer end of the lug 72. Intermediate the lugs 71 and 72, I attach a split cam 75 retained in fixed position on the sleeve 70 by the set-screw 76 and the clamping bolts 77. The engagement face of the cam 75 is formed in two elevations 75a and 75b, both concentric with the sleeve 70 on which the cam is mounted. My retaining means, hereinbefore described, is positioned relative to the engagement face of the cam 75 in such a manner that the cam roller 35 will normally contact there against.

Referring to Fig. 4, I eliminate the piston packing 17 as shown in Fig. 1 and use a packing 17a in the reduced portion 8a of the bore 7 which packing is held against the shoulder 8b by the threaded washer 16a. This washer 16a prevents the passage of brake fluid from the transverse opening 36 to the bore 7. I provide an expansion spring 78 around the reduced portion 12' of the member 10a equivalent to the piston 10. From the portion of the bore 7, in which the spring 78 is housed, I provide an air vent 79 through the body portion 6 and any base upon which the same may be mounted.

Referring to Fig. 5, I disclose a locking means of modified form for retaining the releasing member 11 in operative or inoperative position. The body portion 6 is provided with a longitudinal slot 80 and the releasing member 11 is provided with an oppositely registering opening 81. Extending upwardly from the body portion 6, I provide a support 82 from which extends the arm 83, in which is fulcrumed the locking member 58a, equivalent to the pin 58. The long end of the locking member 58a engages in the opening 81. The locking member 58a is provided with two contacting faces 84 and 85. Intermediate the support 82 and the respective contacting faces 84 and 85, I provide metal bellows 86 and 87, the free ends of which are in operative contact with the respective contacting faces 84 and 85. 88 is a fluid line from the bellows 86, and 89 is a fluid line from the bellows 87, which fluid lines extend to and are connected with the opposite sides of a rotary-plug lock 90. The fluid lines and bellows are filled preferably with a fluid similar to a brake fluid, as commonly used in hydraulic brake systems for automotive vehicles. The plug 91 of the lock is provided with a transverse bore which, when in operative position, will permit the flow of fluid from either fluid line 88 or 89 to the other fluid line. When the plug 91 is turned to locked position, the fluid from either fluid pipe cannot pass through the lock to the other pipe and thus the fluid in the respective bellows 86 and 87 is retained in immovable position therein. This plug lock 90 has not been shown in any specific detail as any desired form of locking means for a fluid line may be used and, if desired, the plug 91 or its similar part in any fluid line locking means may be attached or formed integral with the portion commonly referred to as the barrel of an ignition lock, so that upon rotation of the ignition lock barrel, the plug 91 will be moved a predetermined distance sufficient to lock the fluid in the pipe lines 88—89 and bellows 86—87.

*Operation*

The disclosure of my retaining means, as illustrated in Fig. 1, shows the various parts in operative position for retaining the brakes or a brake system after the same have been moved to holding position and the clutch pedal mechanism in disengaged position. The fluid when forced to the brake cylinders is locked by the valve 40—41 against return through the opening 36 to the master cylinder. The piston 10 is retained in the position as shown in Fig. 1 by the lower end of the locking pin 21 engaging in the oppositely registering opening 22 in the piston 10. This prevents the piston 10 moving to inoperative position under the tension of the spring 31 and the suction or vacuum occasioned in the opening 36, connected to the master cylinder, when the rake pedal is released. The operator might find it desirable or necessary to increase the braking pressure so as to create a more positive brake contact. My construction will permit the operator to do so, by a further pressure on the brake pedal to set up a greater locked fluid pressure beyond the valve 40—41. The creation of greater pressure beyond the valve 40—41 will have no effect on the parts of my device operating in the bore 7 and the parts associated therewith do not prevent such actuation or flow of liquid to provide such increase of pressinur in the brake system. In the disclosure shown in Figs. 1 and 2, the locking means for the releasing member 11 is shown in locked position, the pin 58 engaging in the releasing member 11 as more clearly shown in Fig. 2. The switches 64, 65 and 67 are shown as open and, therefore, the locking pin 58 remains in positive locked position until the operator first closes the ignition switch 67 and then closes the switch 64 which will cause the armature 50 to be drawn downwardly in the solenoid 48, causing the rocker arm 55 to fulcrum and raise the locking pin 58 out of engagement with the releasing member 11. When the releasing member 11 is locked by the pin 58 and the cam roller 35 is in contact with the inner engagement face 75b, the cam 75 is prevented from moving in the direction of the arrow Fig. 1 and the rise portion 92 of the cam 75 will contact with the cam roller 35. Thus, the clutch mechanism rods 73—74 are maintained in a position wherein the automotive vehicle clutch is in disengaged position. When the mechanism of the automotive vehicle is in this position, the motor may be running but the connection to the transmission is broken when the clutch is in disengaged position. At the same time, the brakes are maintained and the brake system is locked in operative position.

On disengagement of the pin 58 from its locking position, the releasing member 11 is free to be moved inwardly by the cam 75, moving in the direction of the arrow, in conjunction with the clutch operating mechanism. The rise 92 of the cam 75 will contact with the cam roller 35 and move the releasing member inwardly of the body portion 6. As the frusto-conical portion of the shoulder 29 moves inwardly, the ball 23 will be raised, simultaneously raising the locking pin 21 flush with the outer circumference of the piston 10. The piston 10, when so released, is permitted to move towards the transverse opening 36 by means of the spring 31 and the vacuum or suction in the end of the bore 7 and the opening 36. When the cam roller 35 fully contacts on the engagement face 75a, the releasing member 11 is moved to its full inward position. Any further movement of the cam 75, occasioned by lost motion or wear of parts, does not effect the desired positioning of the releasing member 11 as the cam roller 35 simply rides further around on the concentric engagement face 75a. Likewise, the same effect is obtained when the cam roller 35 rides on the concentric lower engagement face 75b. When the piston 10 is moved towards the transverse opening 36, the frusto-conical portion 15 engages the lower end of the valve release pin 42 and raises the same to unseat the ball 41. The valve 40—41 is thus opened, the locked brake fluid to the brakes is released and may freely return to the master cylinder of the brake system.

When the piston 10 has been moved towards the opening 36 as just previously referred to, and the releasing member 11 moved inwardly and the cam 75 returned to normal position (moved in the direction of the arrow), the cam roller 35 is in direct contact against the outer engagement face 75a of the cam 75. If the brake is applied without the clutch mechanism being operated, the pressure exerted in the opening 36 (which has communication to the bore 7) will not have any movement effect on the piston 10.

Likewise, if the locking pin 58 is in locked position relative to the releasing member 11, the releasing member 11 will be retained in its inward position and my retaining means, as disclosed in this application, will become inoperative so far as the hydraulic brake system of the automotive vehicle is concerned. When this is in inoperative position, the clutch mechanism and the brake mechanism may be moved or operated as if my retaining means were not a part of the automotive vehicle equipment. To cause the locking condition of the releasing member 11, the movement of the pin 58, as just hereinbefore referred to, is accomplished by the operator closing the switch 67 (if the same be open) and closing the switch 65, which will cause energization of the solenoid 49 and cause the pin 58 to be moved downwardly through the medium of the rocker arm 55 controlled by the movement of the armature 50 upwardly in the solenoid 49.

From the description of my invention as disclosed so far in this application, those familiar with the art will realize that I depend on the fluid pressure in the hydraulic brake system to move the piston 10 towards the releasing member 11. If desired, a member 10a, equivalent to the piston 10, may be constantly under tension to accomplish the same movement in a like direction through the medium of the spring 78. In such modified form therefore, I provide a mechanical means substantially equivalent to the hydraulic pressure means, such as spring 78, for moving the piston 10 or its equivalent 10a in the bore 7. All the other parts of my retaining means and locking features may be the same construction as hereinbefore described and illustrated in Figs. 1, 2 and 3.

In some installations, wherein the main features of my retaining means may be of the construction disclosed in Figs. 1, 2, 3 or in Fig. 4, it may be desirous of providing a manually operated locking means such as that disclosed in Fig. 5 or its equivalent, instead of the electrically operated locking means hereinbefore referred to. The locking means illustrated in Fig. 5 and hereinbefore described, is substantially equivalent in locking effect to the electrically operated means as illustrated in Figs. 1, 2 and 3, in that the locking member 58a locks the releasing member 11 in either operative or inoperative position and that the plug lock 90 may be suitably connected in an ignition switch lock so that the plug 91 will be moved to operative or inoperative position in conjunction with similar movements of the ignition switch.

The foregoing specification and annexed drawing disclose the preferred embodiment of my invention, but it is to be understood that minor changes may be resorted to in the commercial adaptation of my invention without departing from the scope of the invention as hereinafter claimed.

What I claim as new is:

1. In combination with a hydraulic brake system for automotive vehicles, of a means for retaining the fluid in said brake system, comprising a means for retaining the fluid under pressure in the fluid line between the master cylinder of said brake system and the cylinder of each respective brake of said brake system, a means for releasing said retaining means, a means for moving said releasing means to non-releasing position, and means for locking said releasing means against return to a releasing position.

2. In combination with a hydraulic brake system for automotive vehicles, of a means for retaining the fluid in said brake system, comprising a means for retaining the fluid under pressure in the fluid line between the master cylinder of said brake system and the cylinder of each respective brake of said brake system, a means for releasing said retaining means, a means for moving said releasing means to non-releasing position, means for locking said releasing means against return to a releasing position, and means for releasing said locking means.

3. In combination with a hydraulic brake system for automotive vehicles, of a means for retaining the fluid in said brake system, comprising a means for retaining the fluid under pressure in the fluid line between the master cylinder of said brake system and the cylinder of each respective brake of said brake system, and means for releasing said retaining means, said releasing means being moved to non-releasing position by the fluid pressure in said brake system.

4. In combination with a hydraulic brake system for automotive vehicles, of a means for retaining the fluid in said brake system, comprising a means for retaining the fluid under pressure in the fluid line between the master cylinder of said brake system and the cylinder of each respective brake of said brake system, a means for releasing said retaining means, said releasing means being moved to non-releasing position by the fluid pressure in said brake system and means for locking said releasing means against return to a releasing position.

5. In combination with a hydraulic brake system for automotive vehicles, of a means for retaining the fluid in said brake system, comprising a means for retaining the fluid under pressure in the fluid line between the master cylinder of said brake system and the cylinder of each respective brake of said brake system, a means for releasing said retaining means, said releasing means being moved to non-releasing position by the fluid pressure in said brake system, means for locking said releasing means against return to a releasing position and means for releasing said locking means.

6. In combination with a hydraulic brake system for automotive vehicles, of a means for retaining the fluid in said brake system, comprising a means for retaining the fluid under pressure in the fluid line between the master cylinder of said brake system and the cylinder of each respective brake of said brake system, a means for releasing said retaining means, said releasing means being moved to non-releasing position by the fluid pressure in said brake system, means for locking said releasing means against return to a releasing position, means for releasing said locking means, means for locking last said releasing means in predetermined operative or inoperative position and a cover for enclosing last said releasing means and last said locking means.

7. In combination with a hydraulic brake system for automotive vehicles, of a means for retaining the fluid in said brake system, comprising a means for retaining the fluid under pressure in the fluid line between the master cylinder of said brake system and the cylinder of each respective brake of said brake system, a means for releasing said retaining means, said releasing means being moved to non-releasing position by the fluid pressure in said brake system, means for locking said releasing means against return to a releasing position, means for releasing said locking means, means for locking last said releasing means in predetermined operative or inoperative position and means for operating last said locking means into and out of locking position.

8. In a hydraulic brake system for vehicles, means to prevent brake-release flow of the fluid without interfering with brake application flow of such fluid, a vehicle clutch-controlled operator releasing the flow preventing means to avoid its function, and means for locking the operator in such position to permit conventional flow of braking fluid for brake control.

9. In a hydraulic brake system for vehicles, a valve means, said valve means when functioning preventing flow of braking fluid from the brakes without interfering with fluid flow to the brakes, a vehicle clutch controller operator operative under clutch release movement to move the valve to a non-functioning position to permit conventional flow of the brake fluid, and means releasable at will for locking the operator beyond the influence of the clutch.

10. A construction as defined in claim 9, wherein the lock-releasing means is electrically controlled.

11. A construction as defined in claim 9, wherein the release of the locking means automatically returns the operator to the controlling influence of the clutch.

12. In a brake system for vehicles, means for retaining fluid under pressure between the master cylinder and each brake cylinder, a release means for said retaining means, a lock for said release means, and fluid pressure control to move the releasing means to non-releasing position.

CHESTER A. SPOTZ.